Patented Nov. 19, 1940

2,222,520

UNITED STATES PATENT OFFICE 2,222,520

STABLE ORGANIC CALCIUM SALT SOLUTIONS ADAPTED FOR INJECTION

Ernst Sturm and Richard Fleischmann, Berlin, Germany, assignors to the firm of Johann A. Wülfing, Chemische Fabrik, Berlin, Germany, a German company No Drawing. Application November 7, 1938, Serial No. 239,408. In Germany April 27, 1938

8 Claims. (Cl. 167—68)

This invention relates to the production of stable solutions of calcium sodium lactate and solutions adapted for injection.

Solutions of calcium sodium lactate are only stable and thus also utilisable per se for injection purposes when the content in calcium sodium lactate does not exceed 5%. Solutions with a higher content are not stable, that is, after a more or less extended period, there takes place a flaky separation and a crystallisation so that such solutions are unsuitable for injection purposes. The solutions having up to 5% calcium sodium lactate are, on the other hand, not suitable on account of their deficient content in calcium.

Thus, calcium sodium lactate solutions could not be used for parenteral calcium therapy although calcium sodium lactate is, per se, particularly suitable, since the phenomena of inflammation and pains do not occur with intramuscular injection, and in the case of intravenous injection the unpleasant heating feeling, which otherwise occurs with calcium salts.

It has now been found that stable calcium sodium lactate solutions containing a higher percentage of calcium sodium lactate and adapted for injection can be made by the addition to the solution as stabilising agent of an alkaline earth gluconate and preferably in addition thereto also an alkali gluconate.

Calcium gluconate is particularly suitable if necessary together with sodium gluconate. Strontium gluconate also gives good results.

Particularly highly concentrated stable solutions can be attained if with an addition of an alkaline earth gluconate and an alkali gluconate, the solution is made slightly acid, e. g., it is brought to a pH value of 6.2–6.6. This weakly acid reaction can be attained by means of gluconic acid.

In this way, stable calcium lactate solutions can be made with, for example, 7.5% of calcium sodium lactate, which are particularly suitable for parenteral injection. The calcium content of these solutions is sufficiently high and owing to the added stabilising agent, a flaking or crystallisation of the calcium sodium lactate is avoided, so that stable and consequently utilisable solutions are obtained.

The stabilising agent can be added as such to the calcium sodium lactate solution or it can be produced by conversion in the calcium sodium lactate solution, e. g., by gluconic acid being added to the calcium sodium lactate solution and this gluconic acid being then converted for the formation of the stabiliser for example with calcium oxide or sodium carbonate or with both substances.

In the use of an alkaline earth gluconate and an alkali gluconate as stabiliser, an addition compound of these two substances can be added to the calcium sodium lactate solution. Naturally it is also possible to make the desired stable solution by the solid initial substances being dissolved together or by calcium sodium lactate being dissolved in a solution of, for example calcium gluconate.

As already stated above, stable solutions with a sufficiently high calcium content are attained in this way, the further advantage being attained that on the addition of calcium gluconate the content in calcium of the solutions is raised. By the use of these solutions, no phenomena of inflammation or pains were given in the case of intramuscular injection and the heating feeling did not occur with intravenous injection which accompanies the injection of other calcium salts.

Example I 6.5 gms. of calcium sodium lactate and 5.4 gms. of calcium gluconate are dissolved in about 60 ccs. of boiled distilled water, with heating. The solution is made up to 100 ccs. with boiled distilled water and again sterilised. This solution is sufficiently stable, whereas from a solution of 6.5 gms. of calcium sodium lactate in 100 ccs. of water without the addition of gluconate, filled into ampoules, crystals separated out after 30 days.

Example II 7.5 gms. of calcium sodium lactate are dissolved in about 60 ccs. of hot boiled distilled water. There are added to the solution with heating, 4.5 gms. of calcium gluconate and a solution of 4.06 gms. of gluconic acid in about 20 ccs. of water, which has been neutralised with 1.1 gms. of sodium carbonate. The solution is now made up to 100 ccs. with boiled water and filled as in Example I, germ-free into ampoules, and again sterilised. It is sufficiently stable.

A solution of 7.5 gms. of calcium sodium lactate in 100 ccs. of distilled water filled into ampoules becomes on the contrary, flocculent after 20 days and has almost entirely crystallised out after 30 days.

Example III 8.4 gms. of calcium sodium lactate are dissolved with heating in about 60 ccs. of boiled distilled water and 3.65 gms. of calcium gluconate and 3.2 gms. of gluconic acid are added to the solution. The acid solution is now adjusted with sodium carbonate to a pH value of 6.2 to 6.6 and is made up with boiled distilled water to 100 ccs. After germ-free filtration, filling into ampoules and sterilisation, this solution will keep for a long time.

On the contrary, crystals separate out after seven days from a calcium sodium lactate solution of 8.4% filled into ampoules.

*Example IV*

65 gms. of calcium sodium lactate are dissolved with boiling with 54 gms. of calcium gluconate in 750 ccs. of water. A second solution with neutral reaction is prepared from 49 gms. of gluconic acid (lactone), 13.25 gms. of sodium carbonate and 200 ccs. of water, the sodium carbonate being gradually added to the boiling gluconic acid solution. After both solutions have been filtered, they are mixed together and boiled with reflux cooling for 1 hour. After cooling, the solution is made up with boiled distilled water to 1000 ccs., acidified with lactic acid to a pH value of 6.6, and, after germ-free filtration, sterilised.

*Example V*

6.5 gms. of calcium sodium lactate are dissolved in 60 ccs. of water with boiling. During the boiling, 2.75 gms. of anhydrous strontium gluconate is slowly added. A second solution is prepared from 2.4 gms. of gluconic acid which is dissolved in 30 ccs. of water and neutralised with 0.65 gms. of sodium carbonate. The two solutions are mixed, boiled for a short time and made up with boiled distilled water to 100 ccs. The solution is filled germ-free into ampoules and sterilised.

What we claim is:

1. A stable organic calcium salt solution suitable for injection, comprising an aqueous solution containing in excess of 5 percent of calcium sodium lactate, and also containing at least one alkaline earth gluconate.

2. A stable organic calcium salt solution suitable for injection, comprising an aqueous solution containing in excess of 5 percent of calcium sodium lactate, and also containing at least 3.65 percent of calcium gluconate.

3. A stable organic calcium salt solution suitable for injection, comprising an aqueous solution containing in excess of 5 percent of calcium sodium lactate, and also containing a stabilizer comprising calcium gluconate in a proportion of at least 3.65 percent and an alkaline gluconate.

4. A stable organic calcium salt solution suitable for injection, comprising an aqueous solution containing in excess of 5 percent of calcium sodium lactate, and also containing a stabilizer comprising calcium gluconate in a proportion of at least 3.65 percent and sodium gluconate.

5. A stable organic calcium salt solution suitable for injection, comprising an aqueous solution containing per hundred cc's of solution from 6.5 to 8.4 grams of calcium sodium lactate, 3.65 to 6.4 grams of calcium gluconate, and also containing sodium gluconate and gluconate acid and having a pH value between 6.2 and 6.6, said gluconates and gluconic acid being effective as a stabilizer.

6. A stable organic calcium salt solution suitable for injection, comprising an aqueous solution containing in excess of 5 percent of calcium sodium lactate, and also containing a stabilizer comprising at least one alkaline earth gluconate, an alkali gluconate, and an organic acid selected from the group consisting of gluconic and lactic acids and having a pH value between 6.2 and 6.6.

7. A stable organic calcium salt solution suitable for injection, comprising an aqueous solution containing in excess of 6.5 percent of calcium sodium lactate, and also containing a stabilizer comprising calcium gluconate in a proportion of at least 3.65 percent and an alkaline gluconate and having a pH value between 6.2 and 6.6.

8. A stable organic calcium salt solution suitable for injection, comprising an aqueous solution containing in excess of 6.5 percent of calcium sodium lactate, and also containing a stabilizer comprising calcium gluconate in a proportion of at least 3.65 percent and sodium gluconate and having a pH value between 6.2 and 6.6.

ERNST STURM.
RICHARD FLEISCHMANN.